March 30, 1954     J. A. PERRY     2,673,695
LIFT AND PROPULSION SYSTEM FOR CONVERTIBLE AIRCRAFT
Filed March 27, 1952     2 Sheets-Sheet 1

INVENTOR.
JOHN A. PERRY.
BY Willard S. Grove
ATTORNEY.

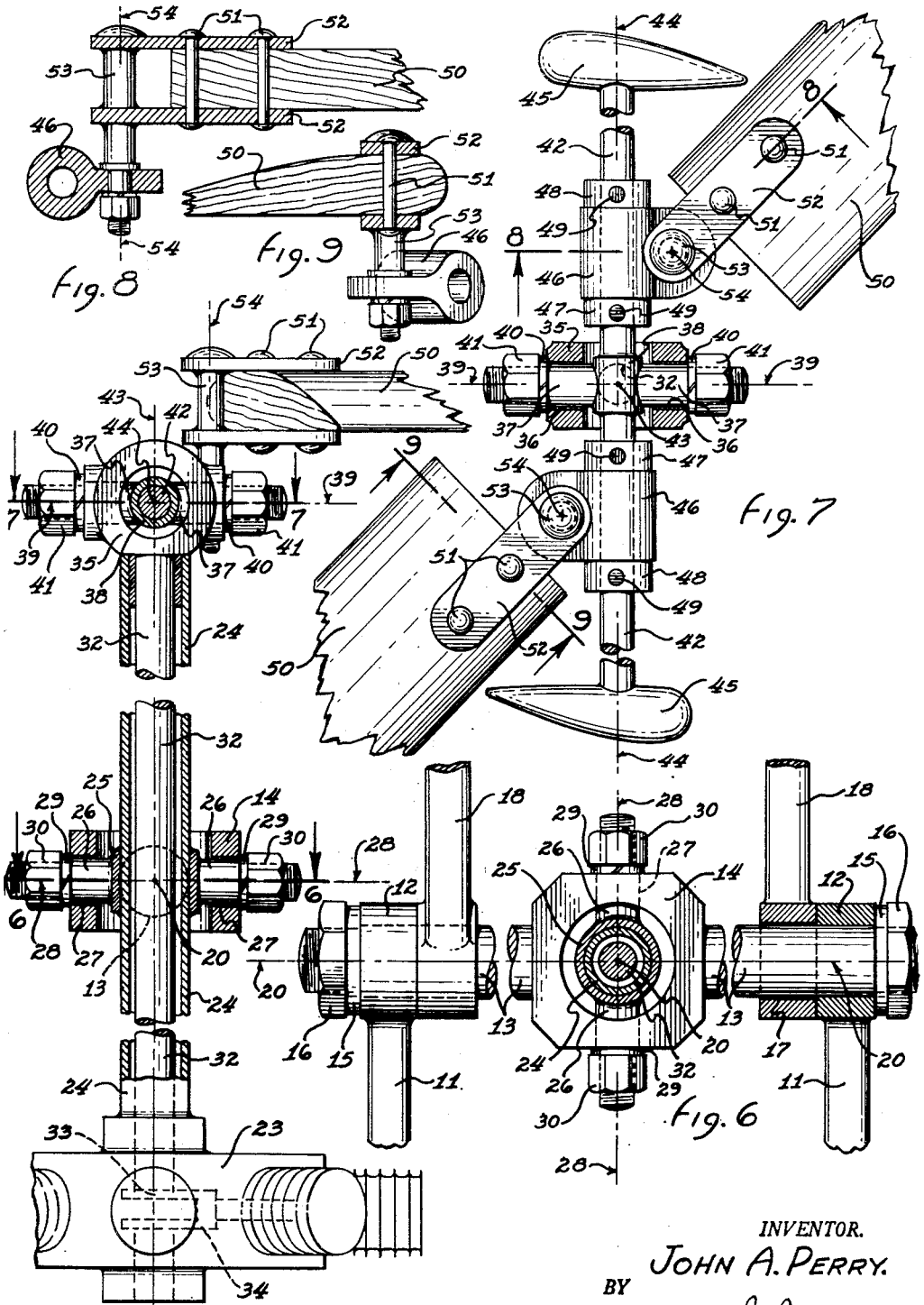

Patented Mar. 30, 1954

2,673,695

UNITED STATES PATENT OFFICE 2,673,695

LIFT AND PROPULSION SYSTEM FOR CONVERTIBLE AIRCRAFT

John A. Perry, Phoenix, Ariz.

Application March 27, 1952, Serial No. 278,907

9 Claims. (Cl. 244—7)

This invention pertains to improvements in airplane structures and is particularly directed to improvements in the lifting and flight sustaining surfaces of airplanes.

One of the objects of this invention is to provide an improved airplane structure having the combined characteristics of a helicopter and a standard airplane which may be selectively and jointly put into operation as desired.

Still another object of this invention is to provide an improved airplane structure comprising a floating wing for normal rapid forward flight movement and a helicopter type of load carrying wing which may be swung from a vertical axis of rotation to a substantially horizontal axis of rotation for purposes of changing the helicopter structure from a lifting structure to a forward travel creating structure for the plane as a whole.

Still another object of this invention is to provide an improved airplane structure having a conventional airfoil section or wing pivotally mounted on the fuselage of the plane for free swinging movement about a horizontal transverse axis and to also provide a second propeller type sustaining wing structure rotating about an axis passing thru the axis of pivoting of said aforementioned wing, and in which structure the propeller type wing may be rocked with its axis in a plane perpendicular to the axis of pivoting of said wing structure, to convert said plane from a helicopter vertical moving device to rapid transverse horizontal movement of the plane.

Still another object of this invention is to provide an improved airplane sustaining wing structure comprising a helicopter type blade structure rotatable on an axis which may be tilted from a vertical to a horizontal position and to provide in conjunction with said tilting axis a normal flight wing pivotally mounted about an axis perpendicular to and passing thru the axis of swinging of said helicopter rotor structure.

Still another object of this invention is to provide an airplane which is fully automatic in operation so far as the control of the airfoil lifting sections are concerned and which has a helicopter type rotor structure adapted for transverse and longitudinal swinging movement from a vertical to a horizontal axis for providing the sole means for controlling the direction and speed of the craft.

Further features and advantages of this invention will appear from a detailed description of the drawing in which:

Fig. 5 is a section on the line 5—5 of Fig. 1.

Fig. 6 is a fragmentary section on the line 6—6 of Fig. 5.

Fig. 7 is a fragmentary enlarged section on the line 7—7 of Fig. 5.

Fig. 8 is an enlarged fragmentary section on the line 8—8 of Fig. 7.

Fig. 9 is an enlarged fragmentary section on the line 9—9 of Fig. 7.

Figure 2:
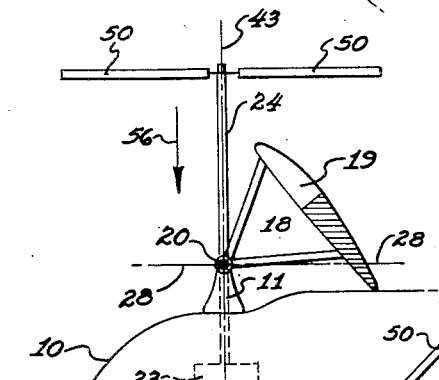
Fig. 2 is a diagrammatic view showing the position of the essential elements of the invention when the plane is landed and stationary or when it is to be used for vertical flight directly upwardly or downwardly relative to the ground surface.

As exemplary of one embodiment of this invention there is shown an airplane structure having a fuselage 10 on top of which are rigidly fixed load carrying posts 11 which have bearings 12 which rotatably journal and support the trunnion portions 13 of the yoke 14 which is located axially in the members 11 by suitable thrust washers 15 and lock nuts 16. Pivotally mounted by means of suitable bearing surfaces 17 on the trunnions 13 are the wing supporting arms 18 which are connected at their upper ends to an airfoil section or wing 19 in a manner, for example, as set forth in applicant's co-pending patent application Serial No. 201,378, filed December 18, 1950. The wing is thus pivotally mounted for swinging rocking movement about the axis 20 of the trunnions 13 of the yoke 14 from a position as seen in Fig. 2 of non-lifting operation as when the plane is standing still on the ground or when in vertical operation thru the intermediate position such as in Fig. 3 to the full high speed flight position shown in Fig. 4 in a manner as fully set forth in said co-pending application, Serial No. 201,378. The axis 20 is located in front of the vertical center line 21 of the chord of the wing and is located below the chord of the wing. Thus with increased forward speed and wind pressure in the direction indicated by the arrow 22 the wing will swing from the retracted tipped back position of Fig. 2 up to position 3 in Fig. 4.

The energizing of the plane in both vertical lifting movements and in forward horizontal traveling movements is effected by a source of power which may comprise a radial internal combustion engine indicated generally at 23 which is secured to the torque or drive tube support member 24 which is rigidly secured to the ring member 25 having the trunnion 26 secured thereto, Fig. 5, and in turn journaled in suitable bearings 27 formed in the yoke member 14, the member 25 and tube 24 being confined axially for rocking movement on the axis 28 by suitable thrust washers 29 and nuts 30. Rocking movement of the shaft 24 about the axis 28 provides lateral control and horizontal directional control of the aircraft.

The upper end of the tube 24 carries a bearing 31 which rotatably supports the rotor drive shaft 32 which is connected at its lower end by a suitable means indicated generally at 33 to the crankshaft 34 of the internal combustion engine 23 and has an integral yoke head 35 having suitable journal bearings 36 which support the trunnions 37 which in turn are rigidly secured to the collar 38 and confined axially for rocking movement about the axis 39 by suitable thrust washers 40 and nuts 41. Also fixed to the member 38 is the wing supporting and counterweight rod 42. The aforementioned assembly therefore is rotated about an axis 43 by the driving power from the motor 23 acting on the drive shaft 32.

The counterweight rod 42 extends diametrically in the direction indicated by its axis 44 and may preferably terminate in suitable stabilizer counterweights 45 fixed to the outer ends of the rod 42. The rod 42 also has loosely pivotally mounted thereon the hinge members 46 confined axially of the rod 42 by suitable thrust collars 47 and 48 securely pinned at 49 to the counterweight rod 42 so that the hinge members 46 and members connected thereto also rock around the same axis 44 of the rod 42.

Rotor wings 50. which function both for vertical load sustaining action and also to effect forward driving of the plane in flight, are fixed by suitable rivets 51 to the arm members 52 which in turn are pivotally mounted by a pin 53 with the respective hinge members 46 in a manner substantially as set forth in applicant's co-pending application, Serial No. 268,069, filed January 24, 1952. The wings are thus free to swing not only about the axis 44 of the rod 42, but also about the axis 54 of the pins 53 carried in the hinge members 46.

Figure 1:
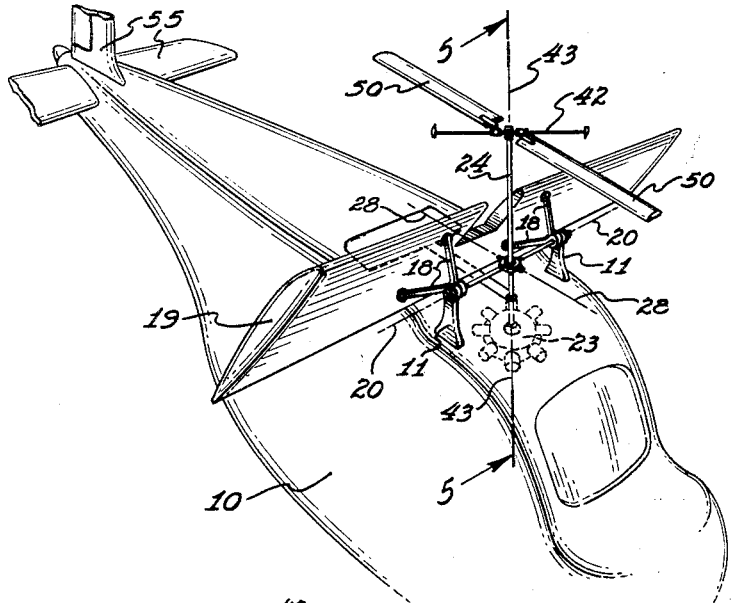
Fig. 1 is a perspective view of an aircraft incorporating the features of this invention.
Figure 4:
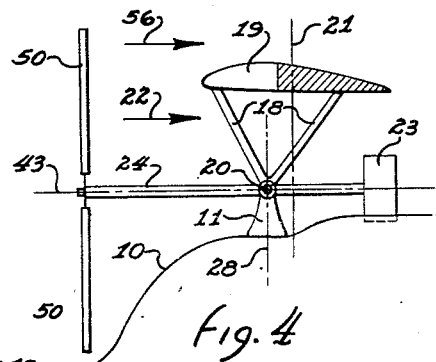
Fig. 4 is a diagram similar to Fig. 2 and Fig. 3 but showing the plane in normal high speed horizontal flight.

It will thus be seen that there is provided an airplane structure comprising a fuselage and a main flight wing 19 pivotally mounted on a transverse horizontal axis 20 on the fuselage and freely swingable about said axis in response to the air flow relative to the wing 19 in a direction indicated by the arrow 22, Fig. 4. It will be further noted that there is provided a main source of driving power 23 which is pivotally mounted on a yoke member 14 for swinging about the same axis 20 from a substantial vertical position as shown in Fig. 2 for direct vertical lifting or descent of the aircraft, or to a horizontal position as indicated in Fig. 4 for maximum forward speed travel, at which time the main flight sustaining wing 19 then comes into full play and the rotor blades 50 then functioning solely as the means for forward movement of the plane in rapid horizontal flight. It will be further noted that lateral or sidewise swinging movement is provided about the axis 28 for the shaft 32 and tube 24 so as to laterally tilt the rotor blades 50 to effect control of lateral stability and direction of flight, which may be aided by suitable tail and rudder structure indicated generally at 55, Fig. 1.

It is to be further noted that in conjunction with this apparatus there is provided a sustaining rotor having a diametrally disposed counterweight and wing supporting shaft 42 pivotally mounted for rocking movement about an axis 39 perpendicular to the main axis of rotation 43 of the drive shaft 32 and rotor blades 50. It is also to be further noted that the rotor blades 50 have freedom of swinging movement by means of the hinge members 46 about the axis 44 of the diametrally disposed rod 42 and that further pivotal action is provided for the wings about the axis 54 and the pins 53 relative to the hinge members 46.

Applicant has found through actual flight tests that the behavior of this aircraft is indeed remarkable and efficient. The effort required to pivot the rotor blades 50 and tube 24 about the axis 20 of common pivotal movement of the main sustaining wing 19 and the rotor structure, is extremely easy and delicate in control. This is due to a combination of features including the pivotal mounting of the rotor blades 50 about the axis 44 of the counterweight rod 42 which allows the wings to automatically without any other cam controls being required to adjust themselves for the change of plane of rotation effected when rocking the rotor blade structure and the drive motor 23 about the axis 20. It is also of interest to note that the main drive motor is pivotally carried on the tube member 24 to act as an efficient counterbalance for the blade structure at all times. Any suitable mechanically operated means under control of the aviator may be provided for rocking the shaft 24, both around the axis 20 for varying the direction of torque reaction from the rotor blades 50 or around the axis 28 for getting the directional control for the aircraft. This specific detail for such controls are well known and form no specific part of this invention. A further detailed description and showing of this subject matter is not, therefore, believed warranted.

Figure 3:
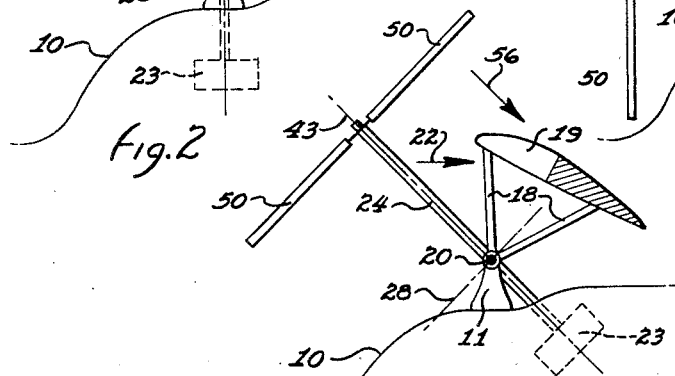
Fig. 3 is a diagram similar to Fig. 2 but showing an intermediate position of rapid take off.

Referring particularly to Figs. 2 thru 4, when the plane is on the ground ready for take-off, as in Fig. 2, and the main sustaining wing 19 is rocked back to an inoperative position, the main rotor is set with the axis of rotation 43 in a vertical position and power then applied to the motor 23 to effect its rotation. This causes the craft to rise vertically as in strict helicopter performance and may hover or descend as desired in a strictly vertical operation. However, by tilting the axis 43 from a strictly vertical position to an angular position, such as shown in Fig. 3, several novel results transpire. By so tilting the axis 43 a forward movement to the plane is produced so that the plane may then be started down the runway or taxied or manipulated in a forward movement as desired. Also, as a result of tipping the rotor blades 50 to the position such as indicated in Fig. 3, the slip stream coming from the rotor blades as indicated by the arrow 56 then applies air in a direction more nearly approaching the normal angle of attack of the air flow over the wing section 19 in flight, this air movement 56 together with the normal forward movement of the air as indicated by the arrow 22 in Fig. 3 results in the air flow over the wing 19 becoming of a character to cause the wing 19 to rock forwardly toward the direction of air flow and to begin taking action toward lifting the plane for normal forward flight.

As the rotor blades 50 are moved to a position where their axis of rotation 43 is more nearly in a horizontal plane, as shown in Fig. 4, the full thrust is then applied to the forward movement of the fuselage of the plane and the air movement from the rotor blades and the forward movement of the plane are substantially parallel in the direction indicated by the arrow 22 in Fig. 4 resulting in the wing 19 taking up full lifting function for high speed forward movement of the craft.

Again, the aviator by merely manipulating the position of the axis 43 of rotation of the rotor blades 50, can rapidly convert plane operation from fast flight, as in Fig. 4, of high speed traverse movement in horizontal direction to a sustained controlled vertical lifting action as shown in Fig. 2. Thus as the plane comes in to land the reversal action from that described in Figs. 2 thru 4 inclusive then results, thus a plane may fly at high speed in open stretches and long flights and then immediately come in over a field and hover and come down in substantially a vertical descent still under definite power control all from the main drive motor 23 by the simple tilting of the main axis 43 of the drive, the rotor blades 50 to to the desired angular position.

There has thus been provided an airplane structure of simple design and operation which has all the desired characteristics of a plane for slow controlled vertical ascent and descent landing and for high speed operation on long flights over open country.

While the apparatus herein disclosed and described constitutes a preferred form of the invention, it is also to be understood that the apparatus is capable of mechanical alteration without departing from the spirit of the invention and that such mechanical arrangement and commercial adaptation as fall within the scope of the appendant claims are intended to be included herein.

Having thus fully set forth and described this invention, what is claimed as new and desired to be obtained by United States Letters Patent is:

1. An airplane structure comprising, a wing, a fuselage, means for pivotally mounting said wing on said fuselage, a rotor, a drive shaft for rotatably supporting said rotor, a drive motor connected to actuate said drive shaft, and means for pivotally mounting said drive shaft, rotor and drive motor for independent swinging movement relative to the swinging movement of said wing on said fuselage about the axis of pivotal mounting of said wing on said fuselage.

2. In an airplane structure having a fuselage, a wing, means for pivotally mounting said wing for free swinging movement about a transverse horizontal axis located on said fuselage below said wing, a rotor, a drive shaft connected to said rotor, means for freely pivotally mounting said drive shaft on said same transverse horizontal axis on said fuselage so that its axis of rotation swings in a vertical plane located at right angles to said axis of transverse horizontal swinging movement of said wing, drive means for rotating said drive shaft, and means for pivotally mounting said drive shaft for sidewise swinging movement about a horizontal longitudinal axis positioned perpendicular to said transverse axis of pivoting of said wing.

3. An airplane structure including a wing, a fuselage, a sustaining rotor, means for pivotally mounting said wing and rotor for independent swinging movement about a common transverse horizontal axis on said fuselage, and power means for driving said rotor.

4. An airplane structure including a fuselage, a rotor, means for pivotally mounting said rotor for free swinging movements about an axis transversely disposed in a horizontal plane and an axis swinging in a vertical plane perpendicular to said transversely disposed axis relative to the direction of normal flight of said airplane, drive means for actuating said rotor in any pivotal position, a wing mounted on said fuselage, a pivotal connection between said wing and said fuselage located below said wing to allow free swinging movement of said wing about said same transverse horizontal axis when in normal horizontal flight.

5. An airplane structure including a fuselage, a pair of laterally spaced trunnion support members fixed on said fuselage defining a transverse horizontal axis of pivotal movement, a wing, means for pivotally mounting said wing on said trunnion support members, a universal joint yoke mounted on said spaced trunnion support members for rotation on said axis of pivoting defined by said trunnion members, a transverse shaft in said universal yoke member, a drive shaft supporting tube mounted on said transverse shaft for swinging in a plane at right angles to said transverse horizontal axis, a source of power mounted on the lower end of said tube, a drive shaft journaled in said tube and connected to be driven by said source of power, and a rotor including a plurality of rotor blades mounted on the upper end of said drive shaft to be driven therefrom.

6. An airplane structure including a fuselage, a pair of laterally spaced trunnion support members fixed on said fuselage defining a transverse horizontal axis of pivotal movement, a wing, means for pivotally mounting said wing on and at a position above said trunnion support members, a universal joint yoke mounted on said spaced trunnion support members for rotation on said axis for pivoting defined by said trunnion members, a transverse shaft in said universal yoke member, a vertically disposed drive shaft supporting tube mounted on said transverse shaft for swinging in a plane at right angles to said transverse horizontal axis, a source of power mounted on the lower end of said tube, a drive shaft journaled in said tube and connected to be driven by said source of power, a rotor including a plurality of rotor blades, a mounting connection for said rotor on the upper end of said drive shaft to drive said rotor from said drive shaft, said connection between said drive shaft and said rotor including a second universal joint yoke, a second transverse shaft pivotally mounted in said second yoke, a diametrically disposed counterweight shaft fixed to said last mentioned shaft, and means for mounting a plurality of rotor blades of said rotor for free swinging movement about the axis of said diametrically disposed counterweight shaft.

7. An airplane structure including a fuselage, a pair of laterally spaced trunnion support members fixed on said fuselage defining a transverse horizontal axis of pivotal movement, a wing, means for pivotally mounting said wing on and at a position above said trunnion support members, a universal joint yoke mounted on said spaced trunnion support members for rotation on said axis of pivoting defined by said trunnion members, a transverse shaft in said universal yoke member, a vertically disposed drive shaft supporting tube mounted on said transverse shaft for swinging in a plane at right angles to said transverse horizontal axis, a source of power mounted on the lower end of said tube, a drive shaft journaled in said tube and connected to be driven by said source of power, a rotor including a plurality of rotor blades, a mounting connection for said rotor on the upper end of said drive shaft to drive said rotor from said drive shaft, said connection between said drive shaft and said rotor including a second universal joint yoke, a second transverse shaft pivotally mounted in said second yoke, a diametrically disposed counterweight shaft fixed to said last mentioned shaft, means for mounting a plurality of rotor blades of said rotor for free swinging movement about the axis of said diametrically disposed counterweight shaft, counterweight means on the outer ends of said diametrically disposed counterweight shaft, a second pivotal connection between said last mentioned pivotal connection of said rotor blades with said diametrically disposed shaft and said rotor blades to allow said blades to automatically orient themselves in an angularly disposed position relative to the axis of said diametrically disposed counterweight shaft.

8. In an airplane structure having a fuselage, a wing, means for pivotally mounting said wing for free swinging movement about a transverse horizontal axis on said fuselage located below said wing, a rotor swinging in an arcuate path lying in front and above the leading edge of said wing, a drive shaft connected to said rotor, means for pivotally mounting said drive shaft independent of the swinging of said wing so that its axis of rotation extends radially of and swings in a plane located at right angles to said axis of transverse horizontal swinging movement of said wing, and drive means for rotating said rotor shaft.

9. An airplane structure including, a fuselage, a main flight sustaining wing, a sustaining and driving rotor swinging in an arcuate path from a vertical to a horizontal position, means for freely pivotally mounting said wing structure with its leading edge below and behind said arcuate path of swing of said rotor to vary the angle of attack of said wing relative to the slip stream from said rotor flowing thereover, power means for driving said rotor, said rotor being swingable in a vertical longitudinal plane about a transverse horizontal axis on said fuselage of said airplane structure to cause said rotor to swing in said arcuate path.

JOHN A. PERRY.

References Cited in the file of this patent

UNITED STATES PATENTS

| Number | Name | Date |
|---|---|---|
| 1,435,848 | Huffaker | Nov. 14, 1922 |
| 1,578,833 | Kogler | Mar. 30, 1926 |
| 1,891,166 | Leupold | Dec. 13, 1932 |
| 2,119,369 | Twining | May 31, 1938 |

FOREIGN PATENTS

| Number | Country | Date |
|---|---|---|
| 865,010 | France | Feb. 10, 1941 |